United States Patent [19]

Fujita et al.

[11] Patent Number: 5,666,520

[45] Date of Patent: Sep. 9, 1997

[54] GRAPHICS DISPLAY SYSTEM INCLUDING GRAPHICS PROCESSOR HAVING A REGISTER STORING A SERIES OF VERTEX DATA RELATING TO A POLYGONAL LINE

[75] Inventors: Ryo Fujita; Kazuhisa Takami; Mitsuru Soga, all of Hitachi; Koji Ozawa, Hitachioota; Takaharu Morishige, Tamamura-machi; Kazuyoshi Koga, Katsuta, all of Japan

[73] Assignees: Hitachi, Ltd., Tokyo; Hitachi Microcomputer System, Ltd., Kodaira, both of Japan

[21] Appl. No.: 215,244

[22] Filed: Mar. 21, 1994

[30] Foreign Application Priority Data

Mar. 29, 1993 [JP] Japan .................. 5-070105
Jun. 8, 1993 [JP] Japan .................. 5-137551

[51] Int. Cl.[6] .................................. G06F 12/00
[52] U.S. Cl. .................. 345/513; 345/501; 345/443
[58] Field of Search .................... 395/140–143, 395/162–166, 501, 513; 345/10, 11, 13, 16

[56] References Cited

U.S. PATENT DOCUMENTS 3,735,389  5/1973  Tarczy-Hornoch ............ 345/16
5,163,127  11/1992  Ikumi et al. ................. 395/126
5,420,972  5/1995  Johnson et al. .............. 395/143

FOREIGN PATENT DOCUMENTS 60-15777   1/1985   Japan ............. G06F 15/72
241790    2/1990   Japan ............. G06F 26/02
2250113   10/1990  Japan ............. G06F 3/153
336676    2/1991   Japan ............. G06F 15/72
3194671   8/1991   Japan ............. G06F 15/72

Primary Examiner—Kee M. Tung
Attorney, Agent, or Firm—Kenyon & Kenyon

[57] ABSTRACT

A graphics display system includes a host processor calculating graphic data and providing the graphic data to a graphics processor, and frame memories which store the graphic pixel data and supply display data to display devices. The graphics display system also includes a first register group which stores the graphics data, a second register group which converts and/or stores the data in the first register group, a pixel generator which generates pixels according to the graphic data in the second register group, and a plotter which writes the pixel data generated in the pixel generator in the frame memories. The second register group fetches the data from the first register group when the host processor issues a command for plotting, holds the data previously written by the host processor. At the same time, when the host processor issues a command for plotting, the specified graphic type is written in the graphic processor as sell as data calculated based on the first and second register groups.

1 Claim, 12 Drawing Sheets line 1 line 2

GRAPHICS DISPLAY SYSTEM INCLUDING GRAPHICS PROCESSOR HAVING A REGISTER STORING A SERIES OF VERTEX DATA RELATING TO A POLYGONAL LINE

BACKGROUND OF THE INVENTION

This invention is related to a graphics display method used to combine line segments to generate and display graphic patterns on screen, as well as to a system that use the graphics display method, especially it is related to a graphics display method suitable for plotting graphic patterns at high speed and a system that use said graphics display method.

Furthermore, this invention is related to a method to generate straight lines on a work station display screen, especially a method appropriate to generate straight lines in a high speed parallel operation using a graphic processor equipped with multiple processors.

In conventional graphics display systems, for example, those disclosed in Japanese Patent Open-Laid No. 3-194671 (1991), the system comprises registers such as the first register group used for graphic pattern data such as start point, end point, colors etc. set by a host processor; and the second register group used to copy graphic pattern data from the first register group when a plotting operation is started, and hold them to use plotting operation. To provide the first and second register groups allows the host processor to write data in them and converts graphic data to pixel one in a parallel operation, highly speeding up the plotting operation.

In addition, the graphics display system, for example, that disclosed in Japanese Patent Laid-Open No. 2-250113 (1990), can operate multiple application programs concurrently in parallel. If more than two processes in those programs use a graphics processor, they cannot access the graphics processor concurrently. To avoid this problem, another means is needed to adjust the access requests from those processes. This adjusting process must requests buffer access before accessing the graphics processor, so it needs more time to read/write data from/in a memory when the process is switched over. The method solves this problem by saving all graphic pattern data set in the graphics processor and reading them out when restarting the processing so that each graphic process can access the graphics processor directly.

On the other hand, when plotting a graphic pattern comprising many line segments, only the end point data on a line of the consecutive line segments is supplied by the graphic processor to speed up the plotting. This system is disclosed in Japanese Patent Laid Open No. 60-15777(1985). In this patent, however, how to apply the system to the graphic processor comprising the two register groups and how to use the adjusting means when controlling multiple processors that access a graphics processor in parallel are not mentioned.

U.S. Pat. No. 5,163,127 also disclosed another method, which generates pixels for a straight line using two or more processors in parallel. In this conventional art, the slope of the straight line is multiplied by an integer indicating the number of the processors in use and the result is added to the coordinates of the start point of the straight line to generate pixels as needed.

In addition, the conventional systems used to plot straight lines are roughly classified into two types; the first type is, as disclosed in Japanese Patent Laid-Open Publication No. 2-41790(1990), a system to generate pixels in an image memory so that they may become the nearest to a given straight line only through fractional calculation. The difference between the true straight line and the integer grid coordinate system in the image memory is represented by a fraction. This is called Bresenham's algorithm. The second type is, as disclosed in Japanese Patent Laid-Open No. 3-36676(1991), a system used to represent the slope of a straight line by a decimal fraction and add the slope value to the start point coordinates repeatedly to generate pixels for the straight line.

The prior art used to generate pixels for a given straight line using two or more processors in parallel, as mentioned above, is effective to calculate both the coordinates and brightness of the pixels at the same time, but it requires a dividing operation to find the slope of a given straight line even when the brightness is fixed. When compared with the method that uses the Bresenham's algorithm the host processor load is increased much more. Concretely, if the Bresenham's algorithm is used, only the coordinates of the start and end points are needed for calculation. For the method that represents the slope of a given straight line by a decimal fraction, the slope and length of the straight line must be given very accurately in addition to the x and y coordinates of the start and end point and the length for the straight line. Therefore, in this case, the host processor load is increased significantly.

SUMMARY OF THE INVENTION

The first purpose of this invention is to supply a graphics display method and a graphics display apparatus that uses the graphics display method to speed up plotting operation by minimizing the necessary amount of the graphic data for the host processor to set to a graphic processor.

The second purpose of this invention is to provide a graphics display method and a graphics display apparatus that uses the graphics display method that allow two or more programs to use the method and the apparatus to achieve the first purpose of this invention.

The third purpose of this invention is to provide a parallel straight line generating method, a graphic processor, and a CAD system, etc. that can reduce the host processor load when improving the Bresenham's algorithm and using two or more processors in parallel to generate straight lines.

The fourth purpose of this invention is to provide a parallel straight line generating method that can suppress expansion of the hardware capacity significantly to improve the Bresenham's algorithm.

The first purpose will be achieved as follows; the host processor sets the graphic data of a given line segment in registers in a graphic processor for plotting, and then if, the processor sets the same graphic data for another line segment, the processor can use the graphic data again, reducing the amount of graphic data to be set in the graphic processor.

The second purpose of this invention will be achieved as follows; if, when the host processor processes two or more graphic processes concurrently, it reads and saves graphic data set so far, then the host processor reads the graphic data to be used again in the graphic processor as mentioned above so that a given graphic process(i.e. program) can access the graphic processor directly. For example, when plotting many line segments in a radial pattern around one point, the host processor will set the start and end points of each line segment in the graphic processor respectively. In this case, the center point, precisely, the start point of each line segment is used commonly.

In this invention, the start points for the second and after are not set from the host processor, but set using the previous start point data repeatedly. In addition, when linking two or more line segments consecutively, precisely, when the end point of a line segment is assumed as the start point of the next line segment, this invention allows the end point data of the previous line segment to be used as the start point data of the next line segment in the graphic processor itself. Such way, the data to be used repeatedly according to the graphic data form can be set only in the graphic processor, not from the host processor. This can reduce the amount of data to be set by the host processor. As a result, the speed of the whole processing can be improved significantly.

If the process is changed over when a given graphic process accesses the graphic processor directly, then the host processor reads the graphic data from the registers of the graphic processor to save it. In this case, the graphic process read updated data, since the data is updated by the graphic processor when the processor issues a command to start the subject plotting operation. If the saved graphic data is read out to restore and the graphic process is restarted, the process before the process switching is made can be restored completely. The third purpose of this invention will be achieved by providing the following means when two or more graphic processors are used in parallel to plot straight lines; a means to specify the coordinates of the start and end points to enter the subject straight line; a means to divide pixels in an image memory into pixel groups for individual cycle arrays and assign a graphic processor for each pixel group; a means to calculate the coordinates of pixels for the subject straight line continuously by subtracting the denominator from the numerator repetitively to convert temporary fractions to mixed numbers and adding the integer part of this mixed numbers to the pixel coordinates if the error term indicating the deviation between the pixel coordinates and the true straight line becomes a temporary numerator when each graphic processor executes the Bresenham's algorithm in its responsible pixel group to find the pixels of the straight line; and a means to plot the pixels found by each graphic processor on a screen.

The Bresenham's algorithm, to put it simply, is a method to represent the slope of a given straight line by a fraction (proper fraction) and find the pixels for the straight line by adding the value of the slope from the start point coordinates sequentially. As the denominator of the fractional expression for a slope, the absolute errors dx and dy of the x and y coordinates of the start and end points (x and y) for a given straight line, whichever it is larger, is given, while smaller one is set to the numerator. The former is assumed as along axis element L and the latter is assumed as a short axis element S. L means the number of pixels to generate. A straight line is assumed here to be declined by 45 degree or under in the first quadrant to simplify the explanation. If a slope S/L is added to the start point coordinates of a straight line, the next pixel on the straight line can be found. To find pixels nearest to the straight line, the result must be round off.

Thus, +0.5 must be added in advance to the start point y coordinate (short axis element side) value. However, since fractions are used to represent coordinates, the denominator of the fractional expression representing the slope must be multiplied by 2L and the numerator must be multiplied by 2S respectively to assume the fractional part of the start point y coordinate as L/2L in advance.

In the actual hardware, at first, the error term E, which is the deviation between the true straight line and the integer grid (pixel coordinates), must be assumed as L, and the slope numerator 2S is added to the L. With this, the coordinates of the next start point pixel are given by a fractional expression.

At this time, if the error term E is greater than 2L, it is a temporary fraction. This must be converted to a mixed number by subtracting 2L from the numerator to update the integer part of the start point y coordinate by once. The x coordinate, which is a long axis element, must be updated once regardless of the E value. By repeating this processing, pixels for the straight line can be obtained only with additions and subtractions.

When generating a straight line such way using two or more processors in parallel, for example, if two processors that handle odd-X coordinate pixels and even-coordinate pixels separately are to be used to generate pixels, one of the processors must be found the pixel after the next one for the current pixel.

Another processor calculates the next pixel at this time. Thus, the processing can be reduced to a half in amount. In this case, the slope for 2 pixels (4S) must be added to the error term E. Furthermore, if the result is a temporary fraction, the integer part of the y coordinate must be updated once or twice. If more processors are used, it is only needed to be the slope 2S multiplied by the number of processors and to let the y coordinate updating value correspond to a range within 0 to the number of processors.

When compared with a case in which only one processor is used for such the processing, the bit length of the slope to be added to the error term E becomes longer.

In addition, a judging circuit must be provided to calculate the number of times to update the y coordinate. For the latter case, two or more circuits are needed to subtract the denominator from the numerator of the error term. If the subject straight line is almost horizontal, the value to update the y coordinate is 0 or 1.

Taking this into consideration, the number of hardware elements are reduced. In other words, only one circuit is provided as a judging circuit to subtract the denominator 2L from the error term E. The judging circuit is used to calculate the number of times to update the y coordinate. The subtraction is repeated until the error term E becomes 2L or under. With this, the number of judging circuits can be reduced.

In the case, two or more processors are used to generate their responsible pixels in a parallel operation, so pixels for a given straight line can be generated at high speed. If the slope of the straight line is small, only one judging circuit is needed. The circuit is used to judge whether or not the error term E is a temporary fraction and the value is greater than the denominator. Thus, judgment is needed only once, allowing the processing to be kept at high speed.

DETAILED DESCRIPTION OF THE PREFERRED EMBODIMENT OF THE INVENTION

Hereafter, an embodiment of this invention will be explained using some figures mentioned above.

Figure 2:
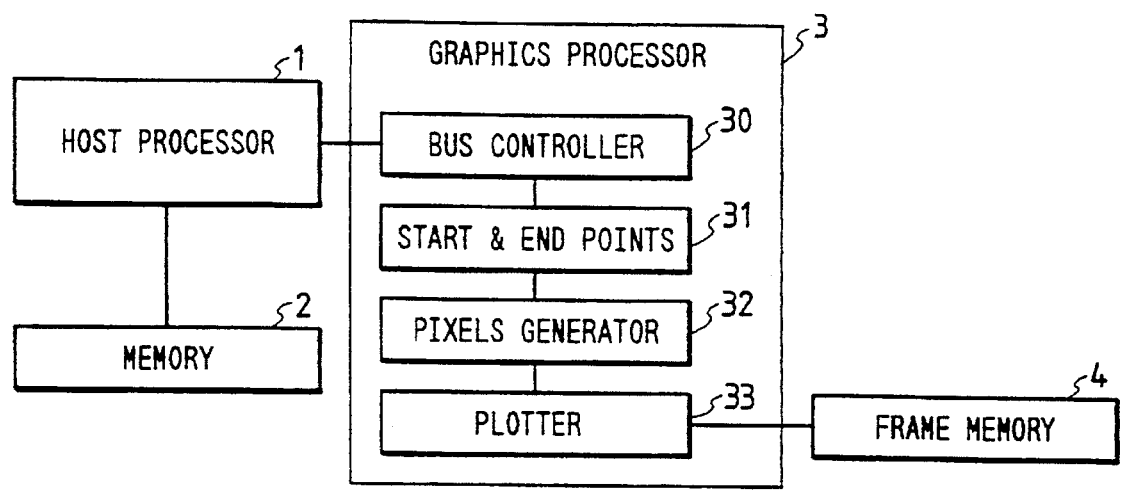
FIG. 2 shows the configuration of the graphics display system described in an embodiment of this invention.

FIG. 2 shows the configuration of the graphics display system related to an embodiment of this invention. The graphics display system in this embodiment comprises a memory 2 to save programs and data; a host processor 1 to execute these programs and send/receive graphic data to/from a graphic processor 3 (to be explained later) and instruct a plotter to execute plotting; a graphic processor 3 to convert graphic data to pixel data and write and read data in/from a frame memory 4 (to be explained later) according to the instructions from the host processor; and a frame memory 4 to hold data pixel by pixel to display it on a display device, such as CRT, etc.

The graphic processor 3 comprises a bus controller 30 to interpret the accesses from the host processor 1; a start and end points processor 31 to save the graphic data received from the host processor 1; a pixel generator 32 to convert graphic data to pixel one according to the graphic data output from the start and end points processor 31; and a plotter 33 to write the pixel data generated from the pixel generator 32 in the frame memory.

This embodiment is featured by the start and end points processor 31. Well-known techniques are used for other elements in the embodiment. So, hereafter, explanation will be made only for the start and end points processor 31 in detail. This start and end points processor 31 plots graphic patterns in which consecutive line segments, precisely, the end point of a line segment can be assumed to be as the start point of the next line segment.

Figure 1:
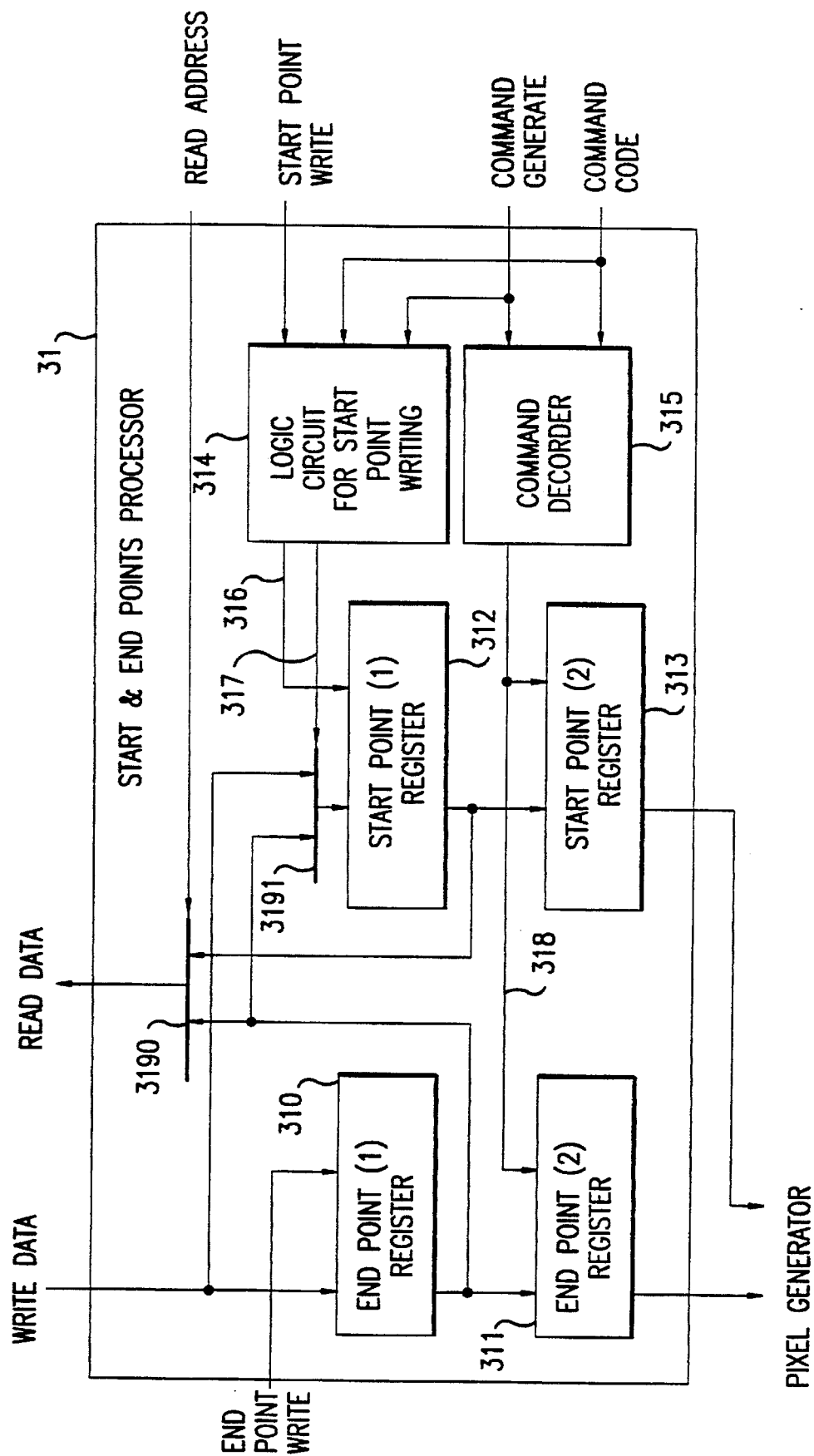
FIG. 1 shows the configuration of the start and end points controller used for the graphics display system described in an embodiment of this invention.

FIG. 1 shows the internal configuration of the start and end points processor 31. The start and end points processor comprises a start point (1) register 312 and an end point (1) register 310 that are included in the first register group; a start point (2) register 313 and an end point (2) register 311 that are included in the second register group; logic circuit for a start point writing processor 314 to control writing into the start point (1) register 312; a selector 3191 to select write data; a command decoder 315 to generate the write signal 318 to the second register group; and a selector 3190 to select read data from the first register group according to register addresses.

Figure 3:
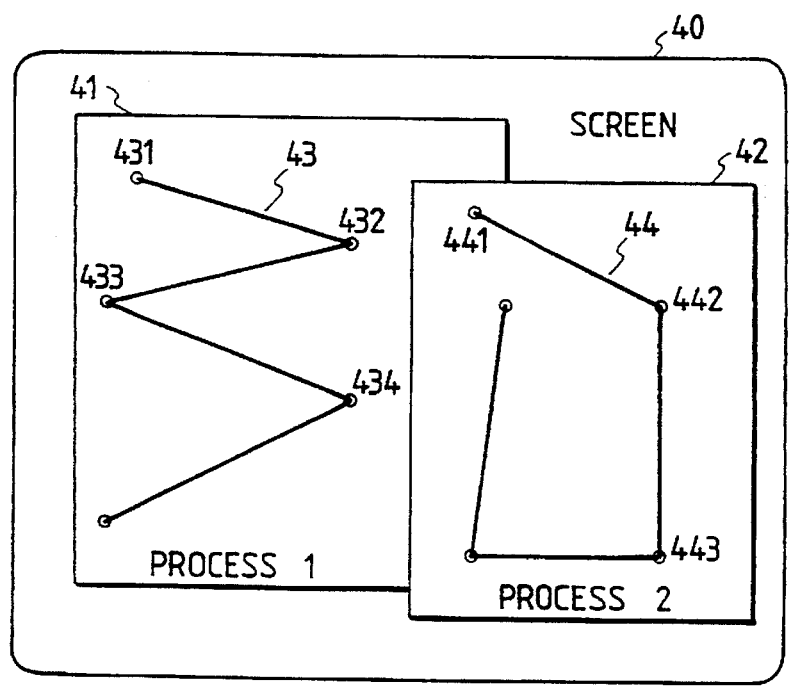
FIG. 3 shows an example of the consecutive straight lines to be plotted.

Next, the operation of the start and end points processor 31 will be explained in detail for plotting a polygonal line as shown in FIG. 3.

FIG. 3 indicates an operation that polygonal lines 43 and 44 are about to be plotted in the two windows 41 and 42 opened on a screen 40 that corresponds to a frame memory 4. When plotting the polygonal line 44, at first, the host processor 1 writes the data of a vertex 441 (that are xyz coordinate data and vertex data here) in the start point (1) register 312. At this time, a bus controller 30 gives the vertex data to the start and end points processor 31 as write data and outputs a start point write signal to the processor 31. Receiving the signal, the start and end points processor 31 allows the logic circuit for start point writing 314 to assume the data select signal 317 as write data and output a set signal 316 from the start point (1) register 312. Such way, the data of the vertex 441 is saved in the start point (1) register 312.

After this, the host processor 1 writes the data of the vertex 442 in the end point (1) register 310. At this time, the bus controller 30 gives the vertex data to the start and end points processor 31 as write data and outputs an end point write signal. The start and end points processor 31 allows the end point write signal to be assumed as the signal to be set in the end point (1) register 310 and the data of the vertex 442 to be written in the end point (1) register 310.

Then, the host processor 1 instructs the graphic processor 3 to plot a straight line. This instruction is issued by writing a value (command) indicating whether to instruct the command register in the bus controller 30 to start plotting of a patterns elected from among "straight line", "triangle", "rectangle", and "character". When an instruction for a straight line is issued,the bus controller 30 outputs a command generate signal and a command code, which is the value in the command register, to the start and end points processor 31.

At this time, the start and end points processor 31 allows the command decoder 315 to output a write signal 318 to the second register group, to set the vertex data from the start point (1) register 312 to the start point (2) register 313, and to set the vertex data from the end point (1) register 310 in the end point (2) register 311. At the same time, if a command code indicates that a straight line is generated, the start and end points processor 31 allows the logic circuit for start point writing 314 to select the output from the end point (1) register 310 side as a data select signal 317, to output the signal 316 set in the start point (1) register 312. As a result, the value in the end point (1) register 310 is set in the start point (1) register 312 to plot the next line segment.

With the above operations, the start and end points processor 31 outputs the vertexs 441 and 442 to the pixel generator 32 as start point and end point data respectively. Receiving the command start signal from the bus controller 30, the pixel generator 32 references to the output from the start and end points processor 31 to create pixels for the subject line (xyz coordinates and color data, etc.).

Next, the host processor 1 writes only the data of the vertex 443 in the end point (1) register 310. (The data of the vertex 442 is already set in the start point (1) register 312 from the end point (1) register 310 in the previous operation.) The host processor 1 then writes straight line command data in the command register of the bus controller 30 so that the straight line maybe plotted. This command register data is accepted when the processing in the pixel generator 32 is completed. A command start signal is generated at this time.

By repeating the above operations, consecutive straight lines can be plotted.

In the embodiment, the graphic data from the first register group is copied and set in the second register group as is. Actually, however, the graphic data in the first register group may be converted for easier processing in the hardware before it is set in the second register group. For example, the (start and end points) data may be converted to the (start point, slope, and length) data and set in the second register group. Of course, in this case, the number of the registers in the second register group must be appropriate to this cnversion.

This invention can also be applied to combine two or more line segments according to a rule, although the embodiment is for plotting a graphic pattern with consecutive straight lines(line segments). For example, for a pattern in which many line segments are arranged in a radial pattern around a point, the start point is fixed while only the end point data is changed one after another to plot the pattern.

In this case, when the buscontroller 30 outputs a command generate signal, if command code is "radial line", then the value in the start point (1) register is held as it is.

Next, explanation will be made for an operation to change processes plotting a polygonal line 44 from polyganal line 43, when two graphic processes are used to plot a polygonal line 43 in the window 41 and the polygonal line 44 in the window 42.

Figure 4:
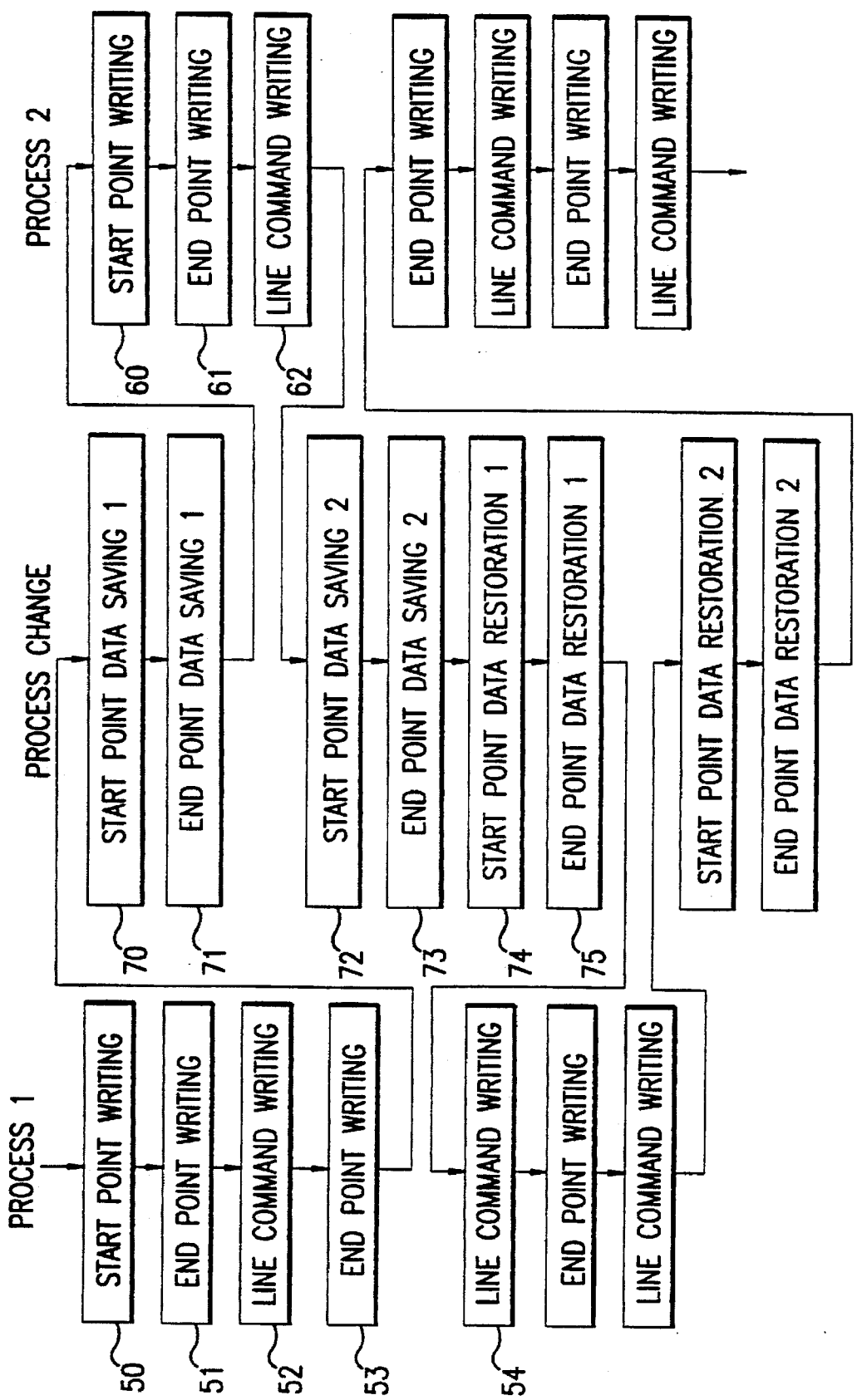
FIG. 4 shows a flow chart of saving and restoring processing executed by two or more graphic processes when a given process is changed.

The processing to plot the polygonal line 43 is assumed as process 1 and the processing to plot the polygonal line 44 as process 2 respectively. The process 1 assumes the vertex 431 as a start point in step 50 (FIG. 4) for writing. With this, the vertex 431 is set in the start point (1) register 312.

Then, when the vertex 432 is written as an end point in step 51, the vertex 432 is written in the end point (1) register 310. If an operation is started to plot a given straight line in step 52, then the value in the start point (1) register 312 is transferred to the start point (2) register 313 and the value in the end point(1) register 310 is transferred to the end point (2) register 311 and the start point (1) register respectively unless the pixel generator 32 is active.

The pixel generator 32 starts generation of a straight line between the vertexs 431 and 432. Then, the host processor 1 writes the data of the vertex 433 as an end point in step 53 to set the data of the vertex 433 in the end point (1) register 310.

When the process is changed here and the host processor 1 goes to the process 2, it saves the graphic data of the start and end points in the memory 2 in steps 70 and 71. At first, when the start point is read in step 70, the read address for the start and end points processor 31 is set in the start point (1) register 312 and the data of the vertex 432 is read through a selector 3190. The start point data is written in the start point saving area of the process 1 in the memory 2.

After this, when the end point is read in step 71, the read address for the start and end points processor 31 is set in the end point (1) register 310 and the data of the vertex 433 is read through the selector 3190. Thus, the data is written in the end point saving area of the process 1 in the memory 2.

After the saving, the process 2 is started. The data of the vertex 441 is then written as a start point in step 60. In step 61, the data of the vertex 442 is written as an end point. If the pixel generator 32 is in the state of idling, not exiting, line command writing in stop 62 is accepted. Then the pixel generator 32 starts the processing to generate a straight line between the vertexs 441 and 442. At this time, in the start and end points processor 31, the data of the vertex 442 is set in the start point (1) register 312, the end point (1) register 310, and the end point (2) register 311, and the data of the vertex 441 is set in the start point (2) register 313.

When the process is changed again at this time and the host processor 1 goes to the process 1 from the process 2, the host processor saves the graphic data of the start and end points of the process 2 in the memory 2 in steps 72 and 73, and restores the graphic data of the start and end points of the process 1 from the memory 2 in steps 74 and 75.

When the host processor 1 reads the start point in step 72, the value in the start point (1) register 312 and the data of the vertex 442 are read and written in the end point saving area of the process 2 in the memory 2.

After this, when the end point is read in step 73, the value in the end point (1) register 310 and the data of the vertex 442 are read and written in the end point saving area of the process 2 in the memory 2.

The host processor 1 reads the data in the start point saving area of the process 1 from the memory 2 in step 74 and writes it in the start and end points processor 31 as a start point. Thus, the data of the vertex 433 is saved in the start point (1) register 310.

The processes changed again in the host processor 1. When the process 1 is restarted, the step 54 operation is executed. If the straight line started in step 62 is already finished at this time, then the line command writing in step 54 is accepted. The value in the start point (1) register 312 (that is, the data of the vertex 432) are transferred to the start point (2) register 313 and the value of the end point (1) register 310, that is the data of the vertex 433 are transffered to the start point (1) register 312 and the end point (2) register 311. The pixel generator 32 starts the processing to generate a straight line between the vertexs 432 and 433.

Hereafter, two or more processes can be executed in parallel in the same way as above.

Thus, a straight line segment of polygonal lines can be plotted by specifying only the end point, as well as the processing can be restarted correctly whenever processes are changed over at any timings if the processing are done so that the data in the first register group is transferred to the second register group, and at the same time the end point data in the first register group is transferred to the start point saving register of the first register group so that the data in the first register group can be read and saved when processes are changed over when a straight line command is decoded and an access to start a straight line is made.

In addition to straight lines as shown in an embodiment of this invention, plotting commands of the continuous triangles (if a triangle formed by the last set 3 vertexs is assumed to be a pattern, another triangle is formed each time the next one is set), character string (the x coordinate of the start point is increased according to the character width), continuous span(span: the y coordinate of a horizontal straight line is increased/decreased by one) can be processed correctly even when the process is changed over at any timings by changing the register updating method according to the command and executing the register updating when the command is started.

According to this embodiment, when a straight lines are to be plotted continuously, the host processor is only requested to set the vertex data of the straight lines in the graphic processor without repeating the data redundantly. This makes it possible to reduce the throughput of the bus to a half of the conventional method. In addition, since each process can access the graphic processor directly while two or more processes are running in a time-split way, the step time to buffer the access contents and the step time to read them can be reduced significantly.

According to this invention, necessary graphic data is obtained and used repeatedly only in the graphic processor, so the graphic data to be set in the graphic processor by the host processor can be reduced.

In addition, each process can access the graphic processor directly, so that multiple processes can be processed in parallel by updating the first register group when starting of a plotting operation according to a command and by reading the graphic data saved in the first register group when the process is changed to another.

Next, another embodiment of this invention will be explained using FIGS. 5 through 14.

Figure 5:
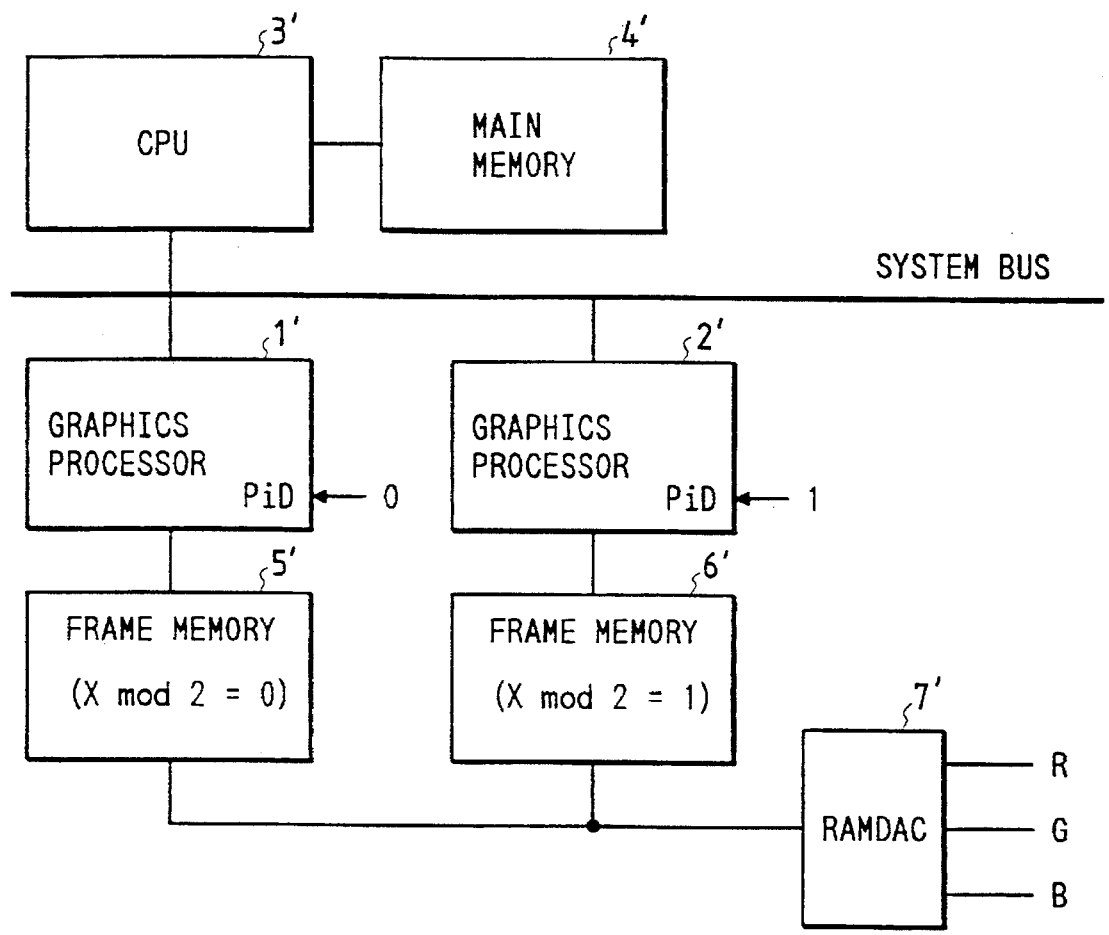
FIG. 5 shows the configuration of the elements in a CAD system described in an embodiment of this invention.

FIG. 5 shows the configuration of the major components of a CAD system. The CAD system is used to plot and display straight lines in a parallel operation. The CPU 3' is the host processor used to execute programs stored in the main memory 4'. The host processor gives the coordinates of the start and end points of each straight line to the graphic processors 1' and 2'. The graphic processor 1' generates pixels for a straight line given by the host processor 3'. The pixels are output to the frame memory 5' that stores only the pixels of even-numbered x coordinates to be output onto a screen. The graphic processor 2', which is the same as the graphic processor 1' in physical structure, generates straight lines for the frame memory 6' that stores only the pixels of odd-numbered x coordinates to be output onto a screen.

Figure 6A:
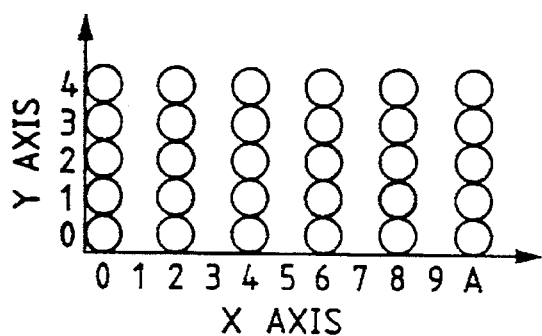
FIGS. 6A and 6B show examples of pixels arrangement in a frame memory controlled by a graphic processor.
Figure 6B:
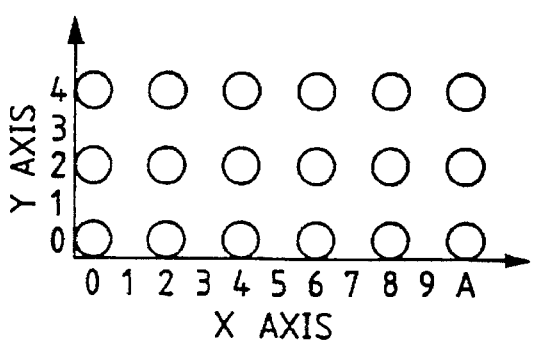

The PiD signal processor (identification signal) is used to identify the frame memories 5' and 6' to which those graphic processors 1' and 2' are connected. "0" is assigned to the PiD signal for the graphic processor 1' and "1" to the PiD signal for the graphic processor 2'. The pixels stored in the frame memories 5' and 6' are always read in order of coordinates and sent to the RAMDAC7' comprising a color conversion table and a DA converter. They are then converted to RGB video signals and displayed on the CRT monitor screen (not shown in the figures). The technologies to display the data in those frame memories on a CRT screen are well known, so no explanation will be made for them here. FIG. 6 (a) shows the pixels handled by the graphic processor 1', precisely, how the pixels is stored in the frame memory 5'. Each circle in the figure shows a pixel. When two graphic processors are used as shown in FIG. 6 (a), pixels are arranged alternately in the x axial direction. If four graphic processors are used as shown in FIG. 6 (b), pixels are processed alternately on both x and y coordinates or spacing 3 pixels on the x coordinates.

In this case, the graphic processor PiD signal comprises 2 bits on both x and y coordinates (4 bits in total) so that four graphic processors can be assigned for both x and y coordinates respectively. So, the number of the graphic processors can be extended up to 16.

Figure 7:
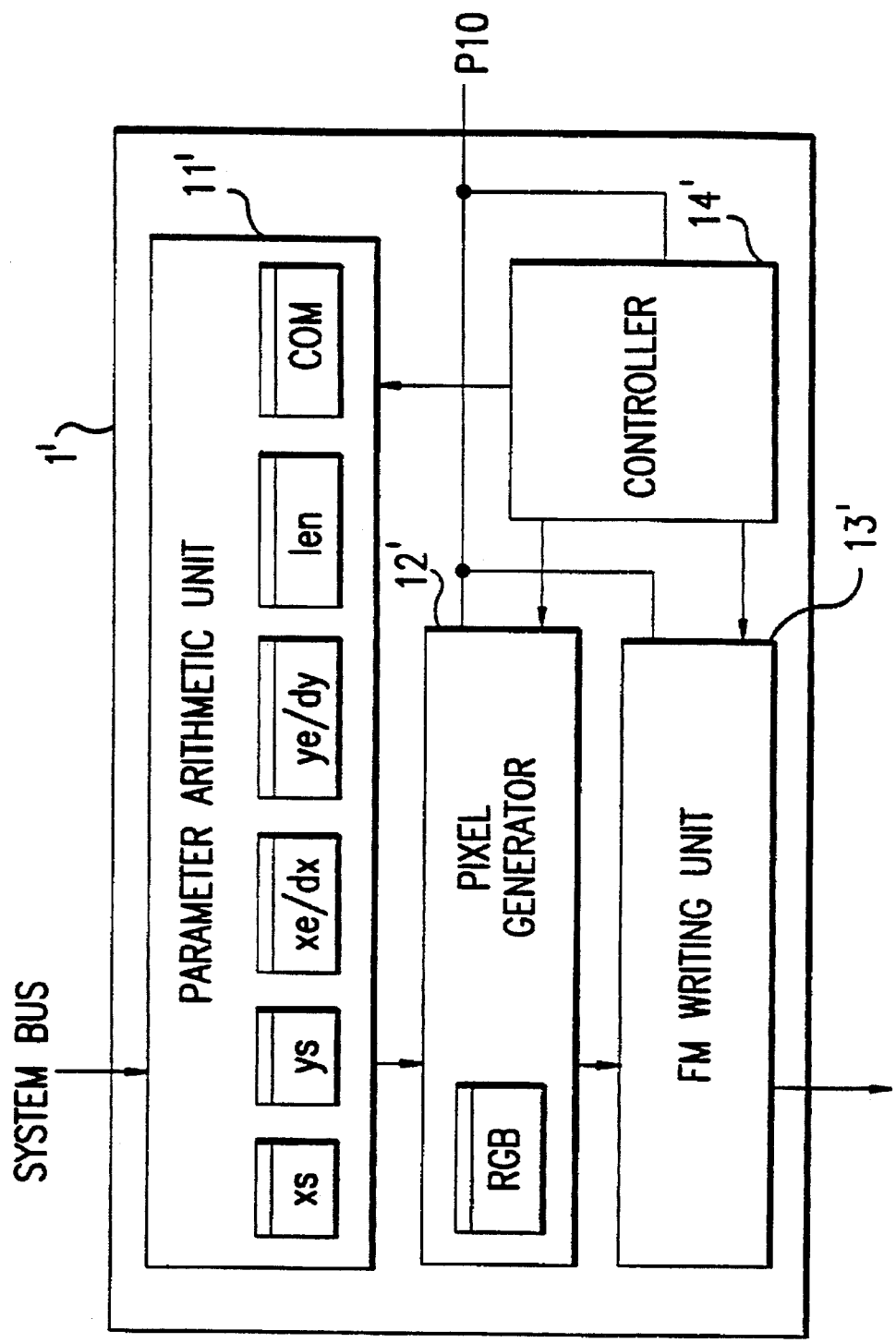
FIG. 7 shows the internal configuration of a graphic processor.

FIG. 7 shows the internal configuration of the graphic processor 1'. The graphic processor 1' comprises a parameter arithmetic unit 11'; a pixel generator 12'; a frame memory (FM)writing unit 13'; and a controller 14'. This parameter arithmetic unit 11' has registers to hold the start point (xs, ys), end point (xe, ye), slope (xe/dx, ye/dy), and length(len) of the straight line set by the CPU3' (FIG. 5) through the system bus. Parameters are generated according to those values. According to those parameters generated by the parameter arithmetic unit 11', the pixel generator 12' generates the coordinates of the pixels indicated by the PiD signal. The FM writing unit 13' writes pixels in the frame memory 5' (FIG. 5) according to the coordinates generated by the pixel generator 12.

The controller 14, when a command is started by the CPU 3', generates pixels for the length of the subject straight line and sends control signals to the pixel generator 12' and the FM writing unit 13' so that the straight line can be plotted.

Figure 8:
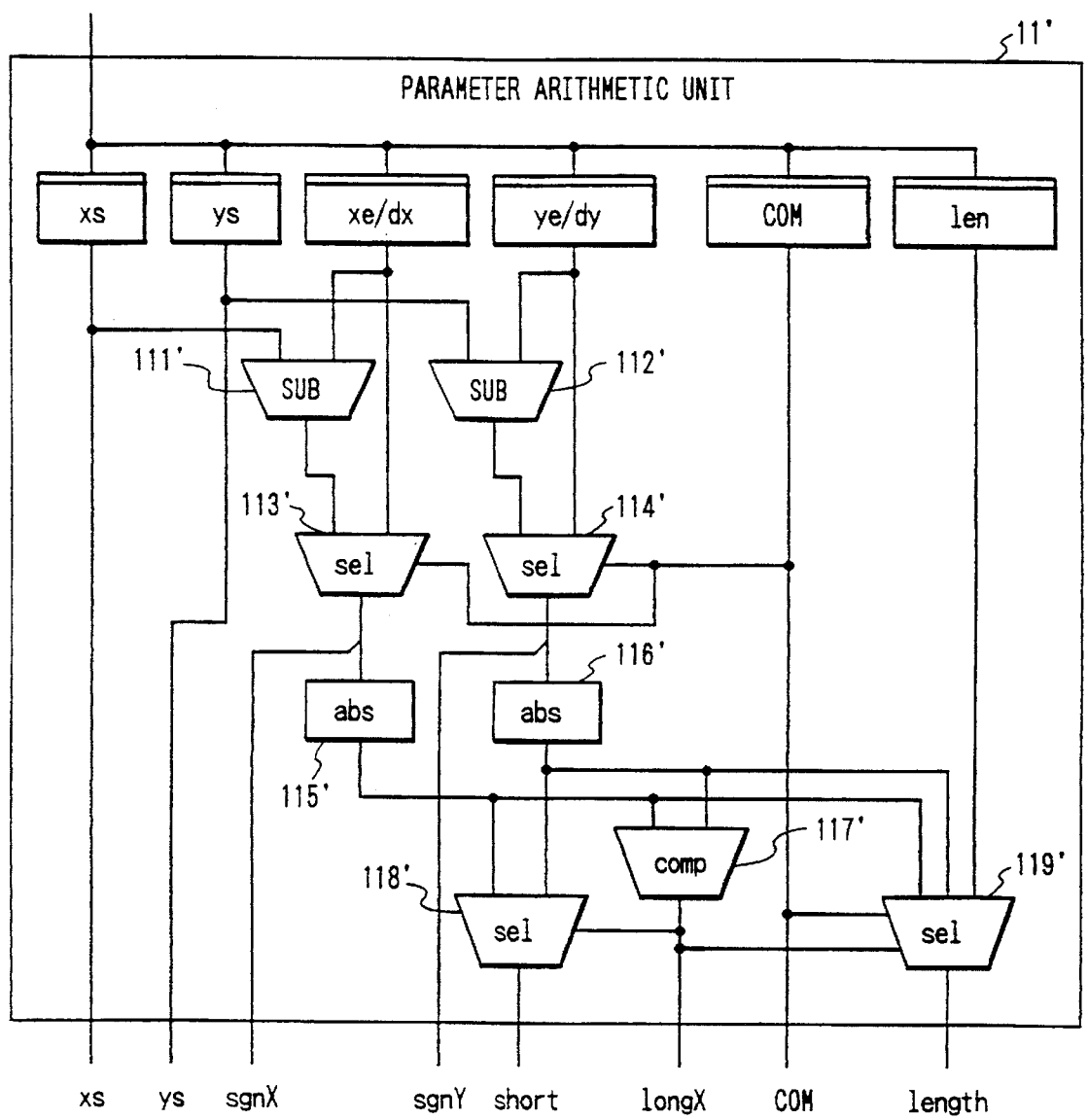
FIG. 8 shows the internal configuration of a parameter arithmetic unit.

FIG. 8 shows the detailed configuration of the parameter arithmetic unit 11'. The parameter arithmetic unit 11' has 6 registers xs and ys to hold the stare point coordinates (x, y); xe and ye to hold the end point coordinates (x, y) when a straight line is specified with the start and end points; dx and dy (the same as X0 and Y0) to hold the slope of a straight line when the straight line is specified with the start point, slope, and length; and len to hold the length of a straight line when the straight line is specified with the start point, slope, and length; and COM to instruct the graphic processor 1' and the graphic processor 2' to specify start and end points or start point, slope, and length for a given straight line). According to the values in those registers, the parameter arithmetic unit 11' outputs the signals xs and ys indicating the x and y coordinates of the start points, the sgn X and sgn Y indicating one of the four quadrants indicated by the direction of the straight line, the long X indicating whether the straight line slope is under 45 degree or over 45 degree to the x axis, the short indicating the difference between the x and y coordinates of the start and end points of a given straight line or the shorter absolute value of the slope dx and dy, the length indicating the longer value, and the COM indicating that the register COM value is output.

The subtractors 111' and 112' are used to calculate the difference between the x and y coordinates of start and end points. Selectors 113' and 114' are used to select the output from the subtractors 111' and 112' and the slope of the straight line held in the registers dx and dy according to the COM signal value.

The absolute value arithmetic units 115' and 116' are used to calculate the absolute value of the outputs from the selectors 113' and 114'. The comparator 117' compares the output from the absolute value arithmetic unit 115' with the output from the absolute value arithmetic unit 116'. The selector 118' selects and outputs the outputs from the absolute value arithmetic units, whichever is smaller, according to the result of the comparison in the comparator 117'. The selector 119' selects the larger value and outputs the value as is if the COM signal indicates that the subject straight line is specified with the start and end points. If not, the selector 119' outputs the value stored in the register len.

Figure 9:
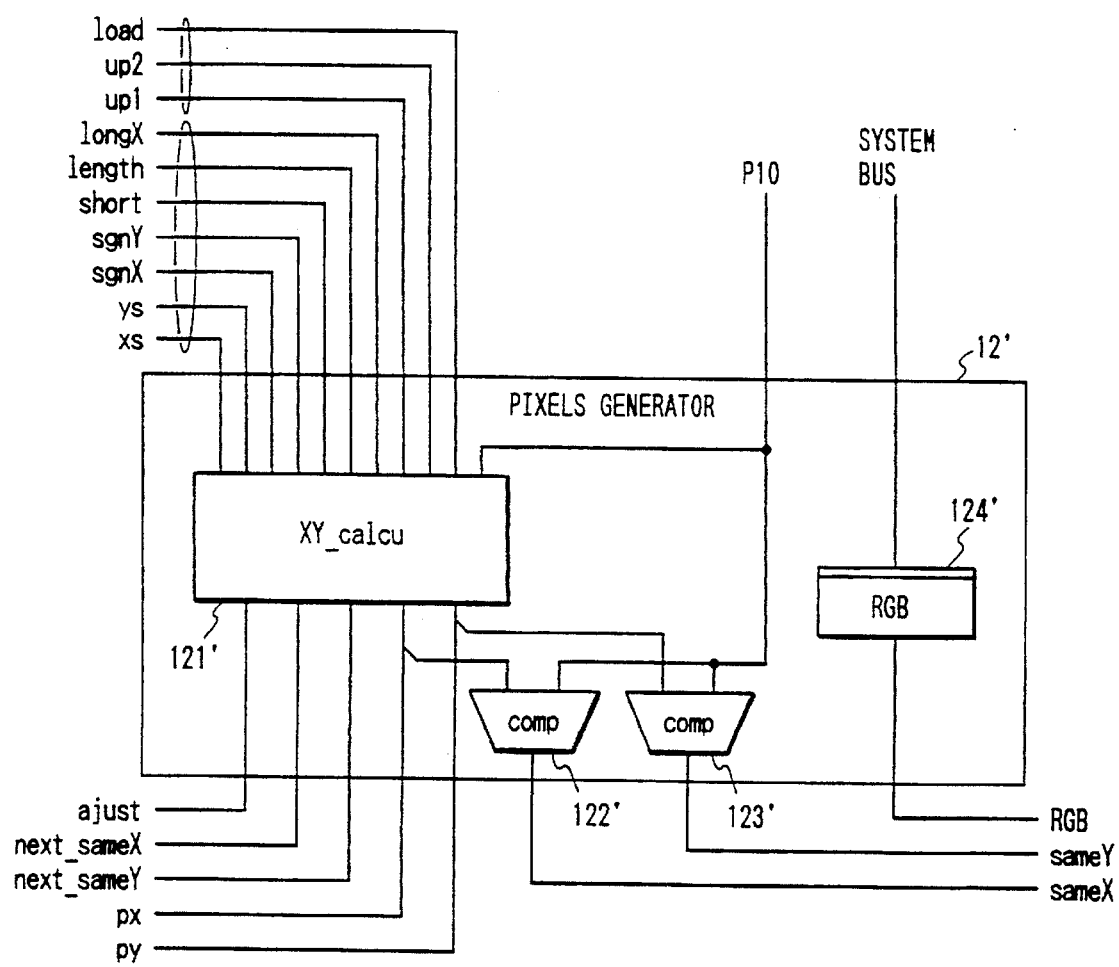
FIG. 9 shows the internal configuration of a pixel generator.

FIG. 9 shows the detailed configuration of the pixel generator 12'. The pixel generator 12' comprises a coordinate generator 121' that outputs the signals px and py of the x and y coordinates of the pixels to be written in the frame memory 5' according to the signals from the parameter generator 11' and the control signals from the controller 14', the adjust signal indicating that the px and py signals are invalid, the next same X and next same Y signals indicating whether or not the x and y coordinates match with the pixel (its own responsible pixel) specified by the PiD signal after the next coordinates are updated; a comparator 122' that calculates and outputs the same X and same Y signals indicating whether or not the coordinates indicated by the px and py signals match with the pixel specified by the PiD signal; and a RGB register 124' indicating the color of the straight line set by the comparator 123' and the CPU 3' through the system bus.

The FM writing unit 13' writes the values of the pixels output from the RGB register in the coordinates px and py output by the pixel generator 12 to the frame memory 5'. The frame memory 5' outputs the FM accept signal to the controller 14'. The signal indicates whether or not writing is enabled.

Figure 10:
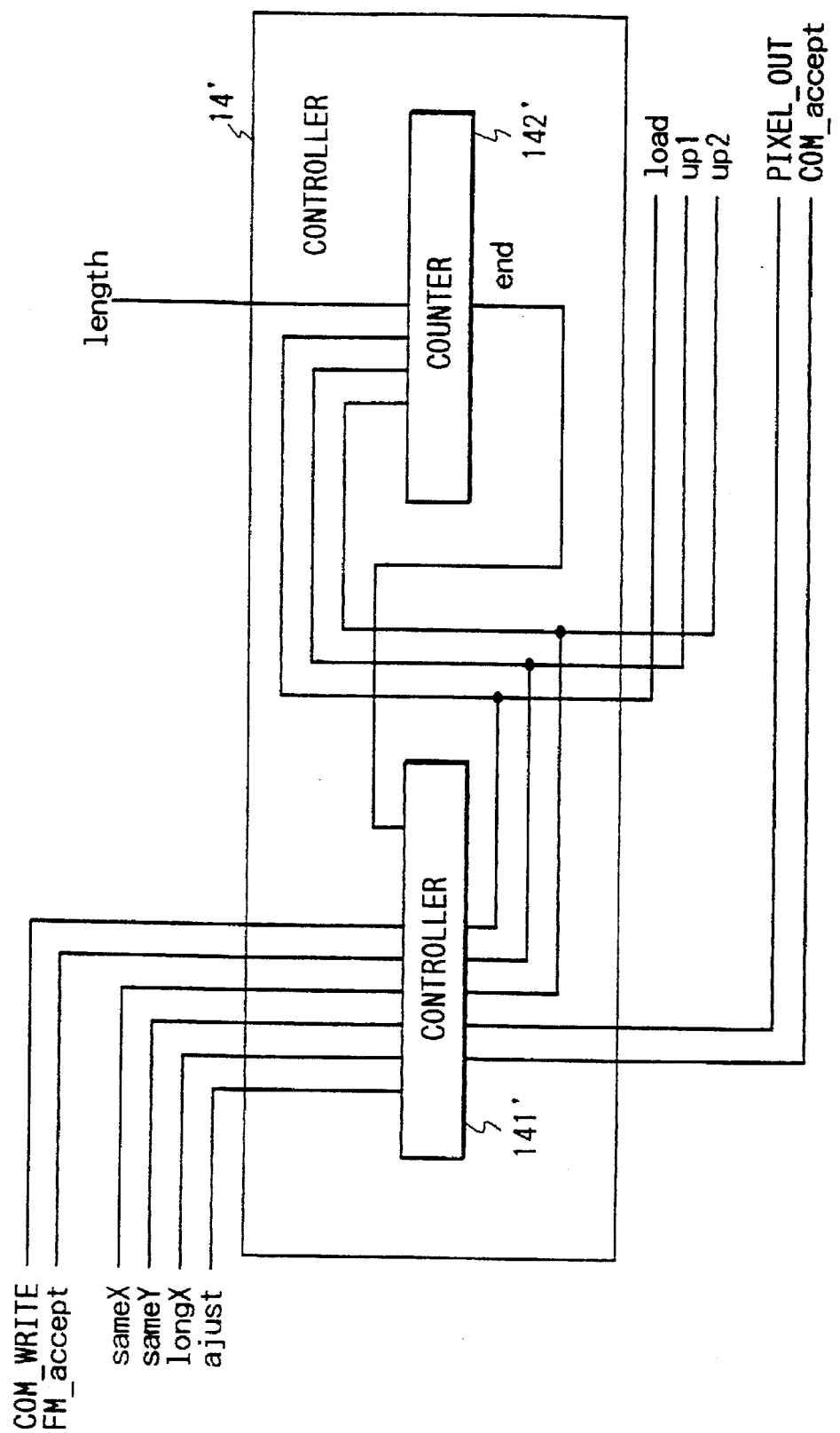
FIG. 10 shows the internal configuration of a controller.

FIG. 10 shows the detailed configuration of the controller 14'. The controller 14' in this embodiment comprises a sequencer 141' and a counter 142'. The sequencer 141' judges whether or not a command is started by the write signal COM WRITE issued to the COM register in the parameter arithmetic unit 11' and outputs of the FM accept, same X, same Y, long X, and adjust signals, as well as the load signal to start the operation of the pixel generator 12' according to the output of the counter 142' (end), 1-pixel updating signal up1; 2-pixel updating signal up2, the pixel write signal PIXEL OUT issued to the FM writing unit 13', the command enable signal COM accept indicating whether or not the graphic processor 1' can accept the command starting.

The COM WRITE and COM accept signals are connected to the system bus interface used to control the writing into the registers in graphic processors.

Hereafter, the pixel generator 12', which is one of the features of this embodiment, will be explained more in detail.

Figure 11:
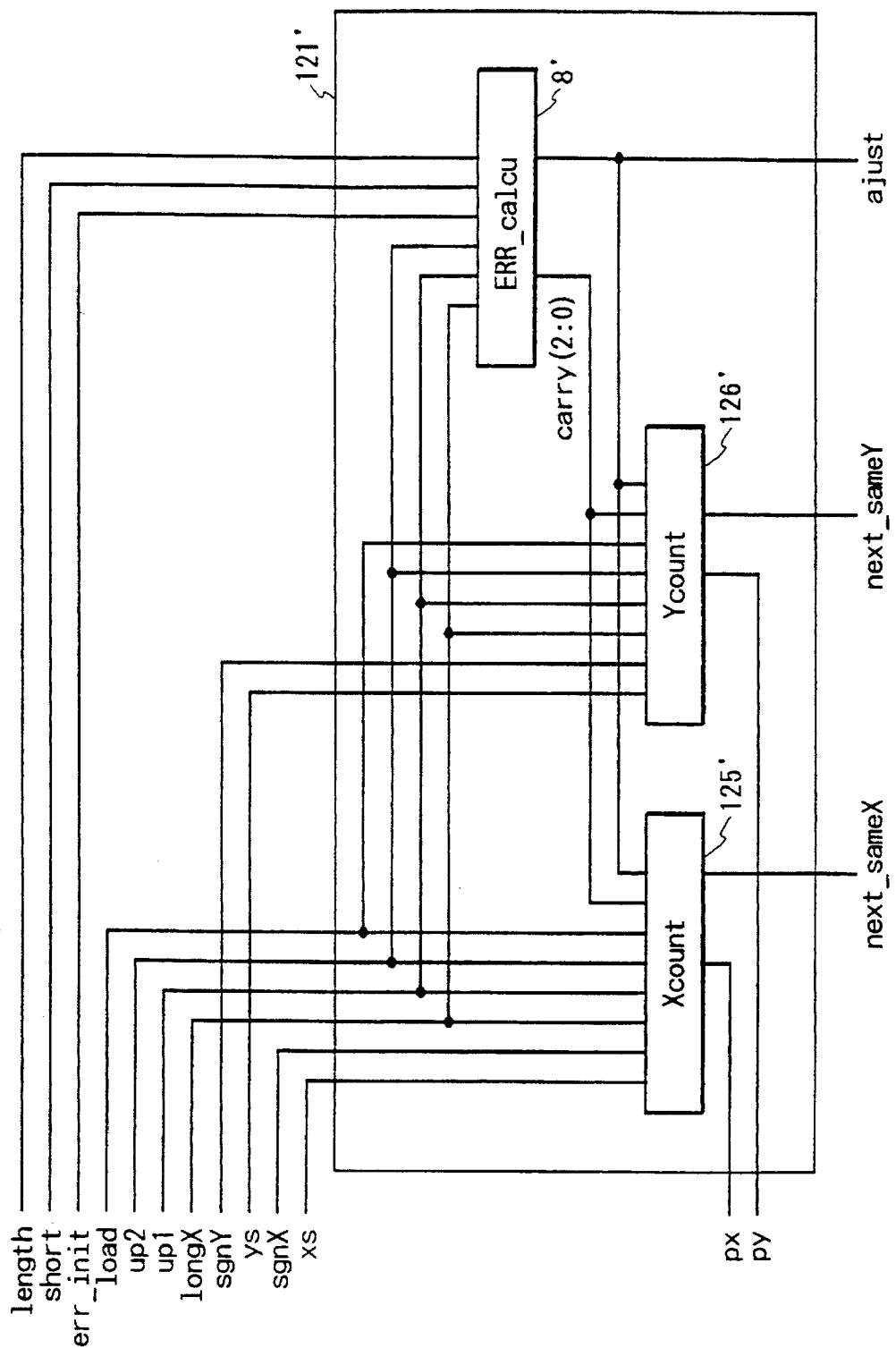
FIG. 11 shows the internal configuration of a coordinate generator in the pixel generator.

FIG. 11 shows the configuration of the coordinate generator 121'. The coordinate generator 121' comprises an x counter 125' to hold the x coordinate; a y counter 126' to hold the y coordinate; and an error arithmetic unit 8' to give information for whether to update those counters.

The x counter 125' fetches the xs signal when the load signal is output and outputs it as a px signal. The sgn X signal is handled as an up/down signal. When this signal value is "1", the x counter 125' counts down. When the value is "0", the counter counts up. When the long X signal value is "1", the straight line is declined by 45 degree or under to the X axis. Thus, the x counter 125' updates the counter value independently of the 3-bit carry signal "carry (2:0)" output from the error arithmetic unit 8'. If the up1 signal value is "1" at this time, the counter is updated by "1". If the up2 signal value is "1", the counter is updated by "2". However, if the adjust signal value is "1", only the y counter 126' is updated. The x counter 125' value remains the same.

On the other hand, when the long X value is "0", the straight line is declined by 45 degree or over to the X axis. So, when either of up1 or up2 is "1", the X counter 125' is updated by the value of the 3-bit carry signal (2:0) output from the error arithmetic unit 8'. In addition, the x counter 125' outputs the next same X signal indicating whether or not the x coordinate, when updated for the next time, matches with the PiD signal.

The y counter 126' works in the same way as the x counter 125', except that the signal ys is fetched according to the load signal and the operation of the counter itself for the long X signal is contrary from that of the x counter 125'.

The error arithmetic unit 8' is updated by the signals up1 and up2 after the error term is initialized by the signal err in it. The result is output as a carry signal (2:0) and an adjust signal.

Figure 12:
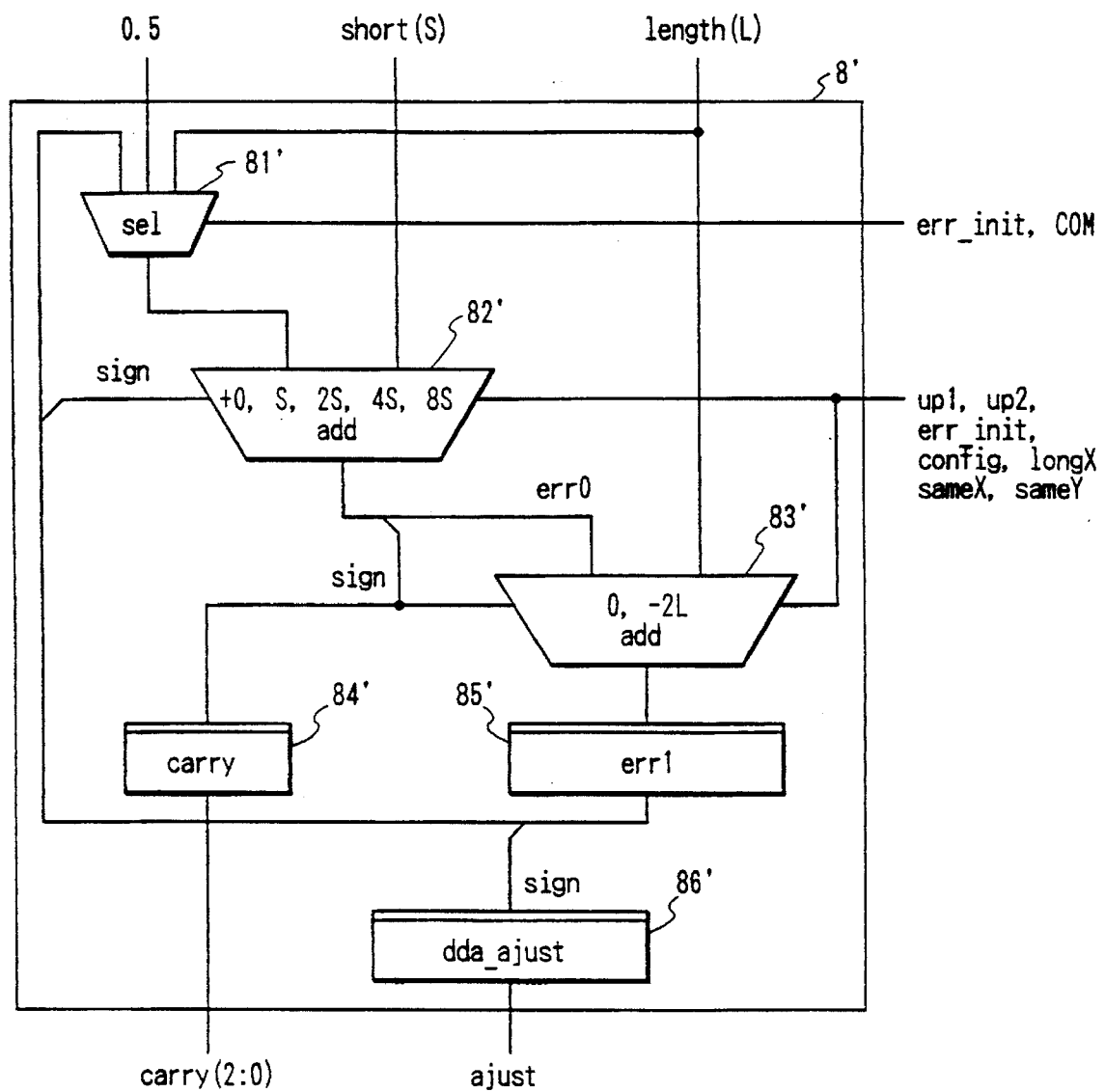
FIG. 12 shows the internal configuration of the error arithmetic unit in the coordinate generator in the pixel generator.

FIG. 12 shows the configuration of the error arithmetic unit 8'. This error arithmetic unit 8' executes operations to be classified roughly into two types; one is the operation executed when a straight line indicated by the COM signal is specified with the slope, the start point, and the length and another is the operation executed when a straight line is specified with the start and end points. The former type operation will be explained below at first.

When a straight line command is started, the controller 14' sends out the signal err in it to the error arithmetic unit 8'. At this time, the selector 81' selects "0.5". The adder 82' adds to its value the signal short (S) that indicates a slope value when the updating signal up1 value is "1". When the up2 value is "1", the adder 82' adds to its value a value obtained by multiplying the signal short value by 2 or 4. No value is added to the adder 83' at this time. The integer part of the result is then stored in the carry register 84' and the fractional part is stored in the error register 85'.

If the start point coordinates do not match with the PiD(identification) signal, precisely, if both same X and same Y values are not "1", then the controller 14' outputs the updating signal up1. If both values are "1", the controller 14' outputs the signal up2. The multiple of the short signal to be added to the adder 82' when the up2 signal value is "1" is determined by the number of processors used by the subject graphic processor. The config signal indicates the number of processors and the config signal is set with an external pin (not shown in FIG. 12). If pixels are arranged alternately, the number of graphic processors indicated by the config signal is multiplied by 2 and when they are arranged at intervals of 4 pixels, the value is multiplied by 4.

Hereafter, how the operation will become when a given straight line is specified with the start and end points.

If a straight line command specified with the start and end points is started, the selector 81' selects the output of the error register 85' and the length signal (in which the sign is reversed; −L). The slope value, 2-time, 4-time, or 8-time value of the short (S) signal is added to the adder 82'. This adder 82' indicates a numerator when a fraction is used to represent the fractional part of the short axis coordinates of the next pixel and the integer part of the carry.

The adder 83' is idle when the result of the adder 82' operation err 0 is a negative value, precisely, when the fractional part is represented by a proper fraction. If the value is positive, the fractional part is represented by a temporary fraction. So, a 2-time length value indicating the denominator value is subtracted from the error. The adder 82' operation result sign bit is saved in the LSB of the carry register 84'. The adder 83' operation result is saved in the error register 85'. The error register 85' sign bit is saved in the register 86' unconditionally, then the adjust signal indicating that the output coordinate is invalid is output.

Hereafter, the error arithmetic unit 8' operation will be explained in detail using FIGS. 13 and 14.

Figure 13A:
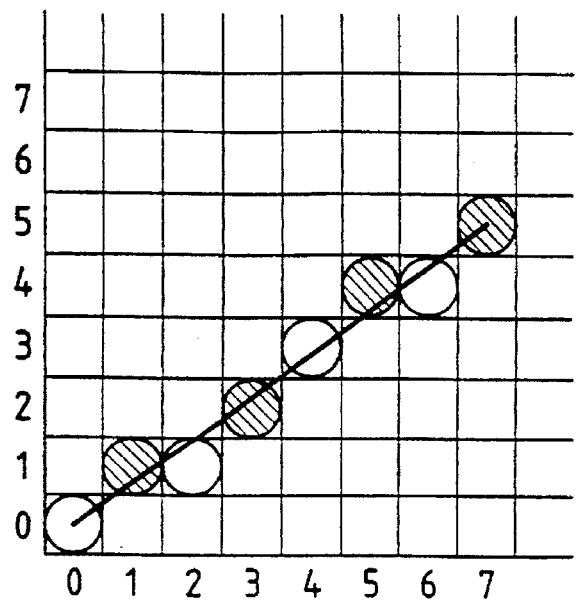
FIGS. 13A and 13B show the pixels generated by a graphic processor when two straight lines are given.
Figure 13B:
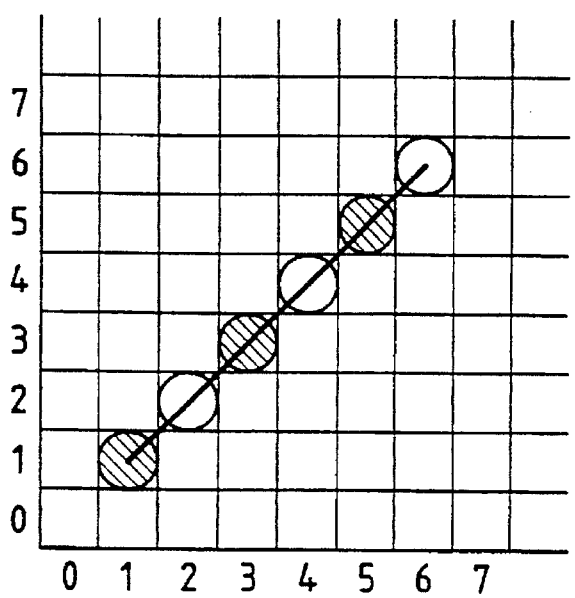

At first, the operation of the graphic processor 2' that handles odd-numbered x coordinates when a straight line 1 shown in FIG. 13 is started will be explained. The start point coordinates (x, y) are specified as (0, 0) and the end point coordinates (x, y) are specified as (7, 5) respectively.

Figure 14:
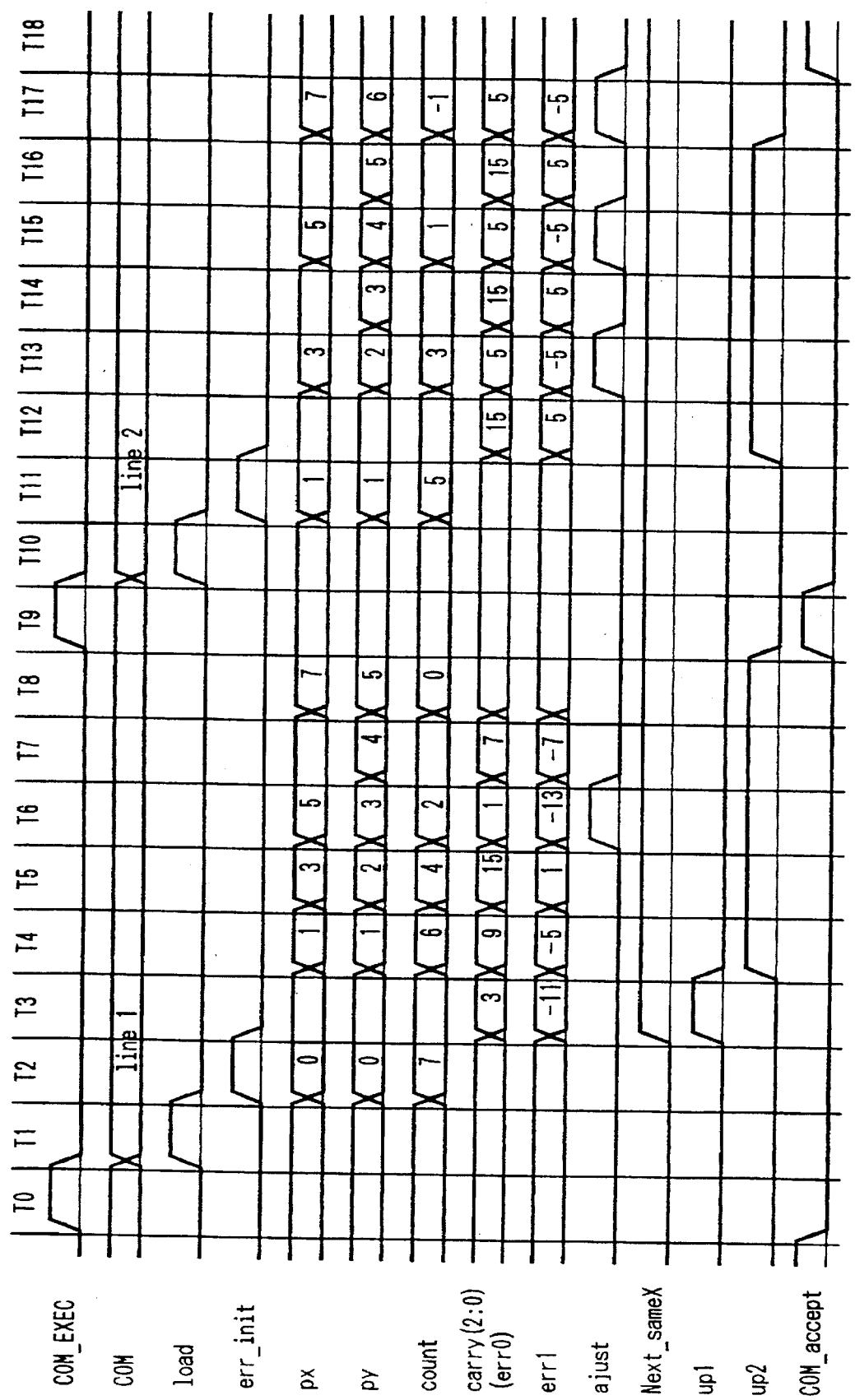
FIG. 14 shows a time chart explaining how a graphic processor operates when an operation is started to plot the two straight lines provided in FIG. 13.

FIG. 14 shows the time chart at this time within times T0 to T8 shown in the left half.

When the CPU3' writes in the register COM, the signal COMEXEC value becomes "1". This COM EXEC signal is output from the system bus interface to the controller 14'.

According to this COM EXEC signal, the controller 14' can know that a command is started. Recognizing that the COM EXEC signal value becomes "1", the controller 14' outputs the load signal to instruct the x counter 125', the y counter 126', and the counter 132 to fetch the output from the parameter arithmetic unit 11'.

After this, the controller 14' outputs the err-init signal to initialize the error arithmetic unit 8'. At this time, the X coordinate is an even number and does not match with the PiD signal, so the same X signal value is not "1". On the other hand, the short axis element short and the long axis element length output from the parameter arithmetic unit 11' are "5" and "7" respectively, so the adder 82 outputs (−7)+2(5)=3.

Since this is a positive value, the adder 83' subtracts the 2-time length value from itself. As a result, "−11" is saved in the error register 85'. In addition, since the adder 82' operation result is a positive value, "1" is saved in the carry register 84'.

The controller 14' outputs an updating signal to update the x and y coordinates after the err-init signal. However, since the coordinate value (px, py) does not match with the PiD signal at the time of T2, the controller 14' outputs the signal up1 to update pixels one by one until the coordinate value matches with the PiD signal. At the time of T3, the carry signal (2:0) is defined, so the x and y counters 125' and 126' can find the coordinates of the next pixel. In this case, the long x axis and the short y axis are always incremented by one respectively, since the carry signal value is "1". This indicates that the next pixel coordinates matches with the PiD signal and the values of both the signals Next same X and Next same Y become "1". As a result, the error arithmetic unit 8' calculates the coordinates for the next and subsequent pixels that are to be arranged alternately. The selector 81' selects the output from the error register 85'. The adder 82' adds to its value the 4-time value of the short signal. Since the result is (−11)+4(5)=9, which is a positive value, the adder 83' subtracts from its value the 2-time value of the length signal. Thus, "−5" is saved in the error register 85'.

The controller 14' sets "0" for the up1 signal when the next pixel matches with the PiD signal. Instead of the up1 signal, the controller 14' outputs the up2 signal at this time. When the up2 is output at the time of T4, the long x coordinate for 2 pixels is updated. The counters 132' that calculate the remaining number of pixels are decremented by 2 respectively.

The short axis y coordinate, however, is updated pixel by pixel. If the error register 85' sign is changed to positive just like at the time of T5, then the fraction indicating the fractional part is a temporary fraction. The short axis y counter is updated once again. The error register 85 is also updated until the value becomes negative. Whether or not the error reregister 85 value is negative can be known by checking the adjust signal value if it indicates that coordinates are invalidate the time of T6 is "1".

FIG. 13 (b) shows an operation to start plotting of the (straight) line 2. For the line 2, the start point coordinates are specified as (1, 1) and the end coordinates are specified as (6, 6). Thus, the values of both long axis element "length" and short axis element "short" are "5". Since the start point coordinate value matches with the PiD signal, the adder 82' calculates the coordinates for a pixel after the next one when the error arithmetic unit is initialized. The adder 82' adds to its value the 4-time value of the short signal from the beginning. The result becomes (−5)+4x(5)=15. The value (15)−2(5)=5 is saved in the error register 85'. The adjust signal value becomes "1". So, only the y counter 126', the error register 85', and the carry register 84' are updated at the time of T13.

Hereafter, the above processing can be repeated until the counter 132' value becomes "0" and the x coordinate becomes an odd-numbered pixel.

According to this embodiment, two graphic processors are used to generate pixels for a given straight line with the start and end points, so plotting a straight line almost horizontal or vertical can be speeded up about double the conventional speed. In this case, the whole straight line generator operation can be speeded up because of both the parallel processing effect and the reduction of calculation amount in the host CPU3'. In the same hardware configuration, this operation is also effective both when a straight line is specified with the start and end points and when a straight line is specified with the start point, slope, and length. This is effective to improve the functions, as well as the hardware throughput.

On the other hand, if the function of the adder 83' is modified so that the 2-time, 4-time, 6-time, or 8-time value of the long axis "length" is subtracted from the adder 83' respectively, then the adjust signal used to indicate that coordinates are invalid during arithmetic operation can be eliminated. This makes it possible to speed up the operation according to the number of graphic processors independently of the slope of the subject straight line. In other words, judging circuits are provided as many as the value possible to be taken in the integer part when a temporary fraction is converted to a mixed number, although this is not clarified in the above embodiment.

According to this invention, if two or more graphic processors assigned in parallel for individual pixels are used to generate pixels for a given straight line, the slope of the straight line is represented by a fraction and pixels closest to a straight line are generated sequentially by adding the slope value to the deviation between the given true straight line and generated pixels. If the deviation value becomes a temporary fraction, the denominator is subtracted from the numerator repeatedly. Thus, high speed straight line plotting is possible with less hardware elements even when the integer part value becomes a temporary fraction larger than "1". In addition, if the means to subtract denominators from nominators is provided to correspond to all the values to be taken in the integer part when a temporary fraction is converted to a mixed number, precisely, as many as the number of graphic processors to be arranged in parallel, no wait time is assumed for conversion of temporary fractions to mixed numbers. The processing can thus be speeded up more significantly.

The slope of a straight line can also be represented by a decimal fraction. In this case, the operation efficiency will be much more improved, because the hardware is shared by the arithmetic unit for calculating decimal fractions.

We claim:
1. A graphics display system comprising:
a host processor providing in an order a series of vertex data of a polygonal line defined with a plurality of straight lines to generate an order for displaying the polygonal lines;
a graphic processor including a register storing the series of vertex data, a graphic pixel generator converting the vertex data to graphic pixel data of the straight line, and a plotter writing the graphic pixel data from the graphic pixel generator; and
a frame memory storing the graphic pixel data written by the plotter;
a display displaying the graphic pixel data from the frame memory;
wherein the register comprises a first start point register storing start point data corresponding to a first of the straight lines, a first end point register storing end point data corresponding to the first of the straight lines based on the vertex data, a second start point register storing start point data corresponding to a second of the straight lines which is connected to the first of the straight lines, and a second end point register storing end point data of said second of the straight lines, wherein said second start point data and said second end point data are converted to the graphic pixel data; and wherein said first start point register stores the end point of the first end point register, said second start point register stores the start point of the first start point register, and said second end point register stores the end point of the first end point register when the host processor generates the order; and wherein data stored in the first start point register and data stored in the first end point register are read out to be stored in a memory before the host processor processes an interrupting order, and said data stored in the memory is restored to the first start point register and the first end point register after the host processor has processed the interrupting order.

\* \* \* \* \*

UNITED STATES PATENT AND TRADEMARK OFFICE
CERTIFICATE OF CORRECTION

PATENT NO. : 5,666,520
DATED : 9 September 1997
INVENTOR(S) : Ryo FUJITA et al.

It is certified that error appears in the above-identified patent and that said Letters Patent is hereby corrected as shown below:

| Column | Line | |
|---|---|---|
| 7 | 18 | Change "polyganal" to --polygonal--. |
| 8 | 18 | Change "processes" to --process is--. |
| 10 | 1 | Change "stare" to --start--. |

Signed and Sealed this

Twenty-fourth Day of February, 1998

Attest:

BRUCE LEHMAN

Attesting Officer    Commissioner of Patents and Trademarks